Fig. 1.

T. GILMORE, Jr.
BRIQUETING MACHINE.
APPLICATION FILED JULY 18, 1919.

1,332,983.

Patented Mar. 9, 1920.
6 SHEETS—SHEET 3.

UNITED STATES PATENT OFFICE.

THOMAS GILMORE, JR., OF BROOKLYN, NEW YORK, ASSIGNOR TO GENERAL BRIQUETTING COMPANY, OF NEW YORK, N. Y., A CORPORATION OF MAINE.

BRIQUETING-MACHINE.

1,332,983.  Specification of Letters Patent.  Patented Mar. 9, 1920.

Application filed July 18, 1919. Serial No. 311,767.

*To all whom it may concern:*

Be it known that I, THOMAS GILMORE, Jr., a citizen of the United States, and resident of the borough of Brooklyn, county of Kings, city and State of New York, have hereunto invented certain new and useful Improvements in Briqueting-Machines, of which the following is a specification.

My invention relates to briqueting machines of the type commonly termed briqueting presses and has for its object to provide an improved and simplified construction whereby the efficiency of the machine and its productive capacity are increased to a maximum extent. Other more specific objects of my invention will appear from the description hereinafter and the features of novelty will be pointed out in the appended claims.

In the accompanying drawings, which, for illustrative and descriptive purposes, show an example of my invention.

Figure 4:
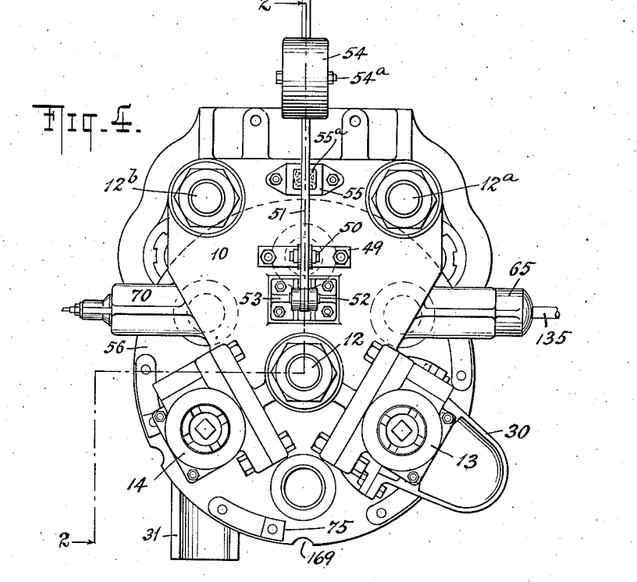
Fig. 4 is a plan view.
Figure 5:
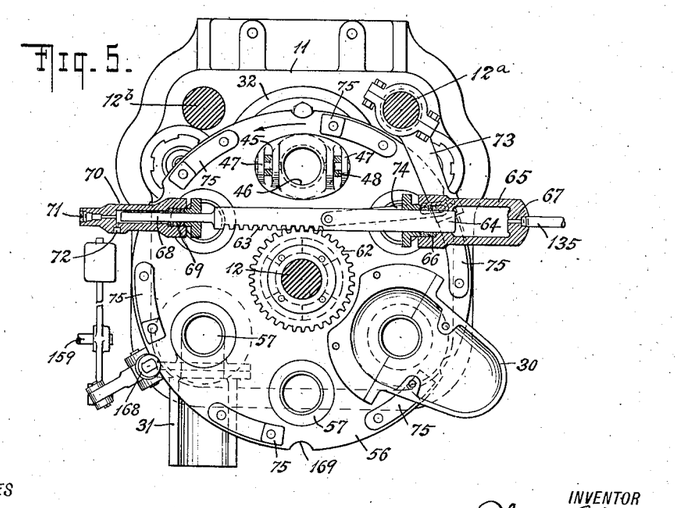
Fig. 5 is a horizontal section on the line 5—5 of Fig. 1.

As shown in the illustrated example, the machine or press comprises suitable upper and lower platens 10 and 11 respectively, arranged in spaced vertical relation to each other and connected by means of vertical posts 12, 12$^a$ and 12$^b$, located respectively at the apices of an imaginary triangle as shown in Figs. 4 and 5. Two upright cylinders 13 and 14 are secured upon the upper platen 10 and are provided with ports 16 and 17 and 18 and 19 located, as shown in Fig. 8, respectively, at the upper and lower ends of each cylinder for the purpose to be more fully described hereinafter; the cylinders 13 and 14 are further provided at their upper and lower portions respectively with air vent valves 20 and 21, which are controlled in any suitable manner as, for instance, by means of check valves 21$^a$, as indicated in Fig. 3.

Figure 8:
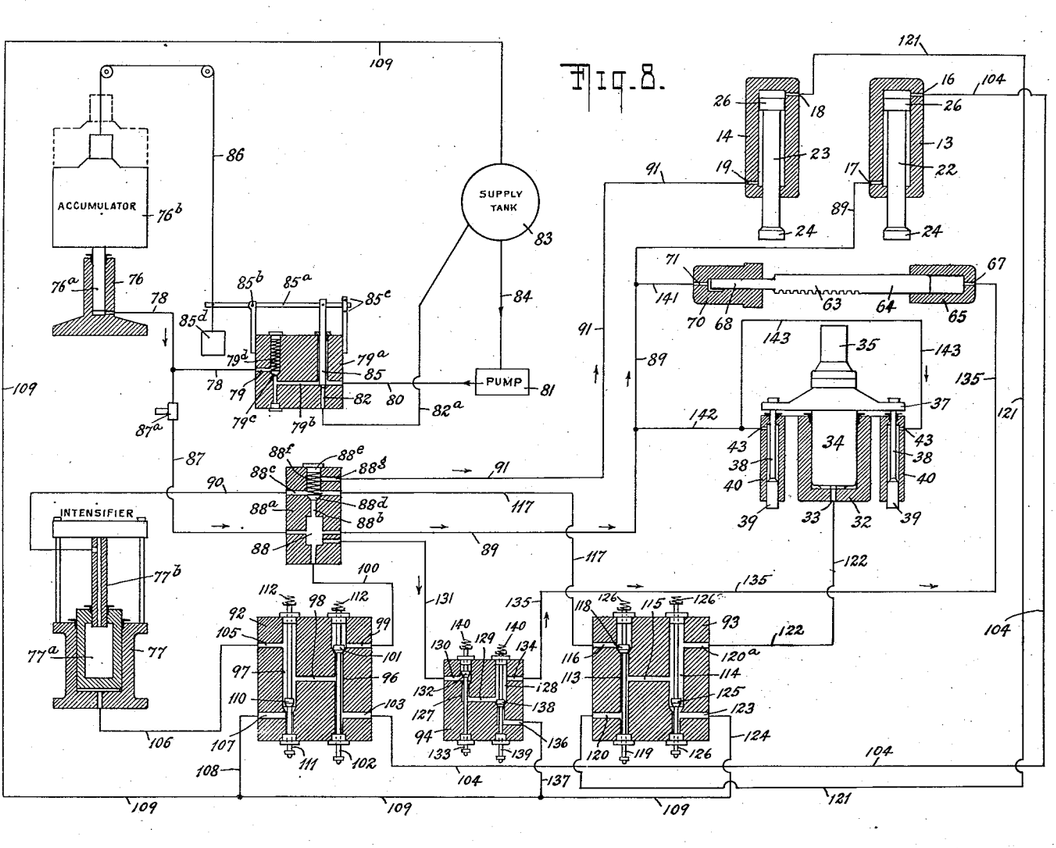
Fig. 8 is a diagrammatic view illustrating the piping in my invention.
Figures 9, 11:
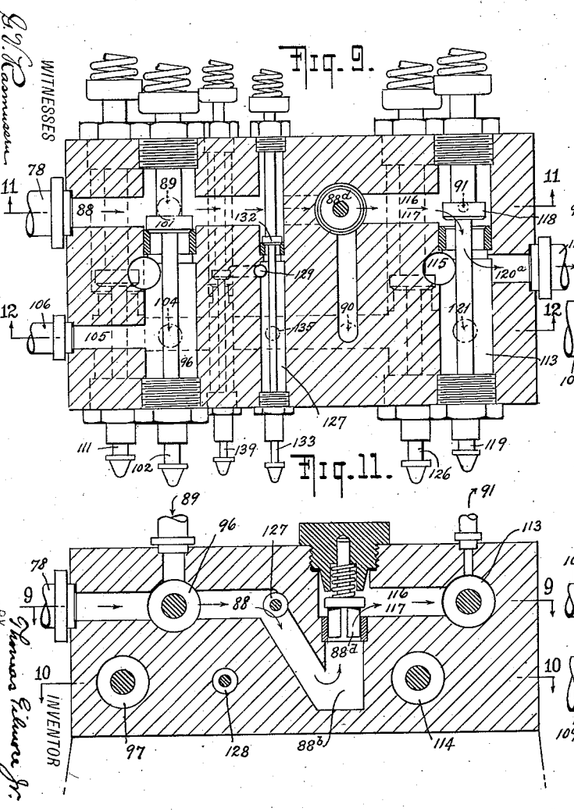
Fig. 9 is a horizontal sectional view of a preferred form of valve arrangement, taken on the line 9—9 of Fig. 11.
Figs. 11 and 12 are vertical sections taken respectively on the lines 11—11 and 12—12 of Fig. 9.
Figures 10, 12:
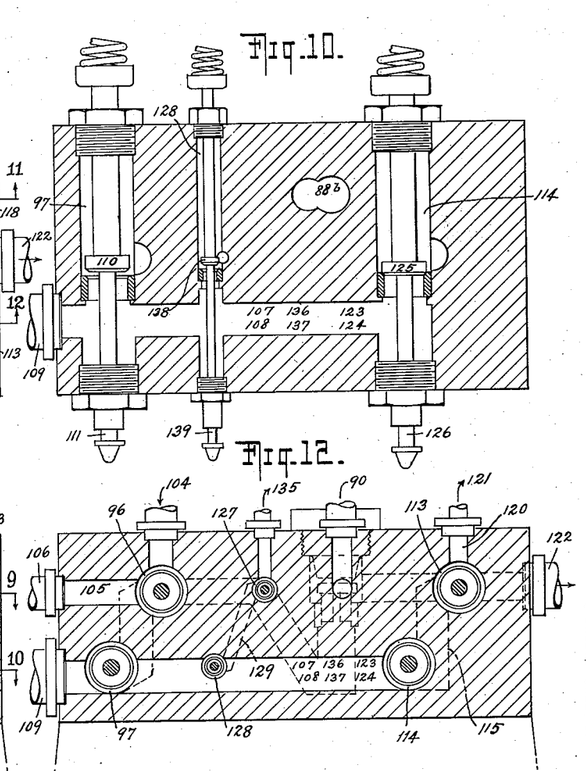
Fig. 10 is a similar view on the line 10—10 of Fig. 11.

A packing plunger or ram 22 is vertically slidable in the cylinder 13 and an ejecting plunger or ram 23 is similarly movable in the cylinder 14 as shown in Fig. 8. The plungers or rams 22 and 23 are of similar construction and each comprises a head 24 suitably secured to the outer ends of the respective plungers by means of a bolt 25 and further includes a piston gland 26 located and fastened upon the inner ends of said plungers as shown in Fig. 3. Each plunger carries a packing 27 located between the gland 26 and an annular flange 28 and passes through a packing 29 suitably secured in the other end of each cylinder 13 and 14 as shown also in Fig. 3. With this arrangement the plungers may be said to be outside packed, the packings, by reason of their locations being easily accessible in contradistinction to existing construction in which the rams are inside packed. The packing ram 22 is located in registry with a filling device 30 which projects as shown in Fig. 4 in the form of a receiving hopper whereby the briqueting material is introduced into the molds at the proper time as will be hereinafter more fully explained. The ejector ram 23, in the same way, is located in registry with a discharge chute 31 whereby the finished briquets are discharged from the machine.

Figures 2, 3:
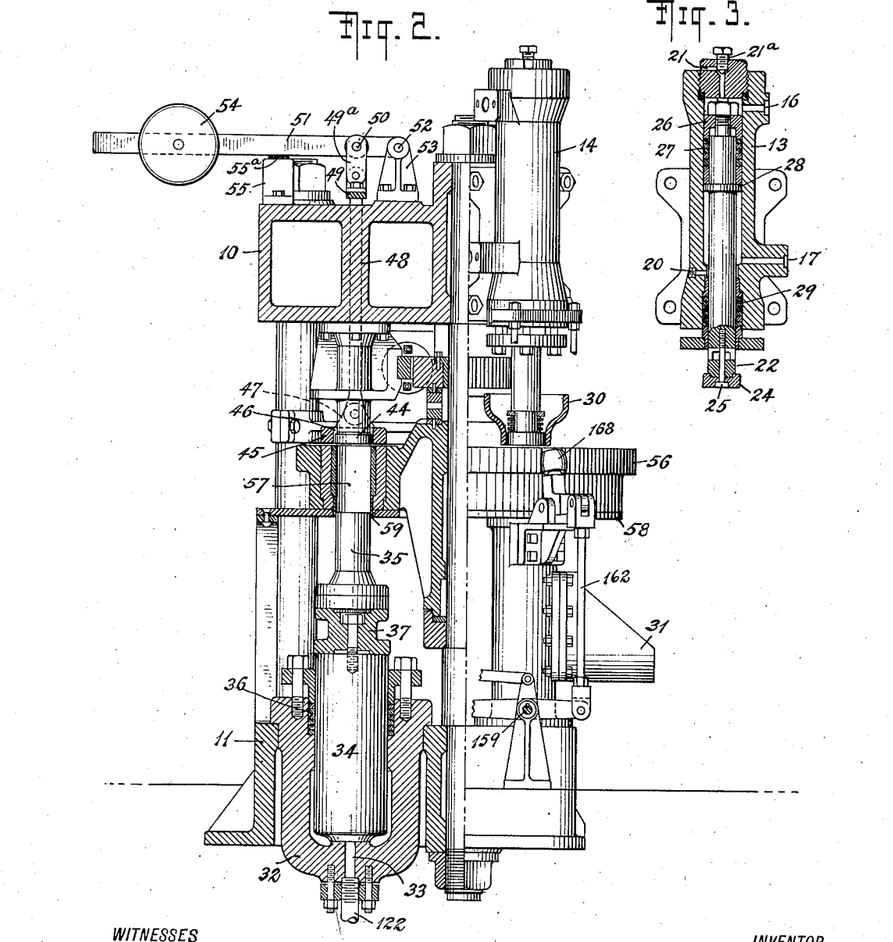
Fig. 2 is a vertical section on the line 2—2 of Fig. 4.
Fig. 3 is a detail section showing one of the plungers and its cylinder.

A main pressure cylinder 32 is set in the lower platen 11 and is provided with a port 33 the purpose of which will be fully described hereinafter; a main plunger or ram 34 is slidably mounted in said cylinder 32 and carries a main pressure plunger 35, projecting upwardly from said ram 34 as shown in Fig. 2. A readily accessible stuffing box or packing 36 is provided at the outer end of the cylinder 32 whereby the main ram 34 is packed as illustrated also in Fig. 2.

Figure 1:
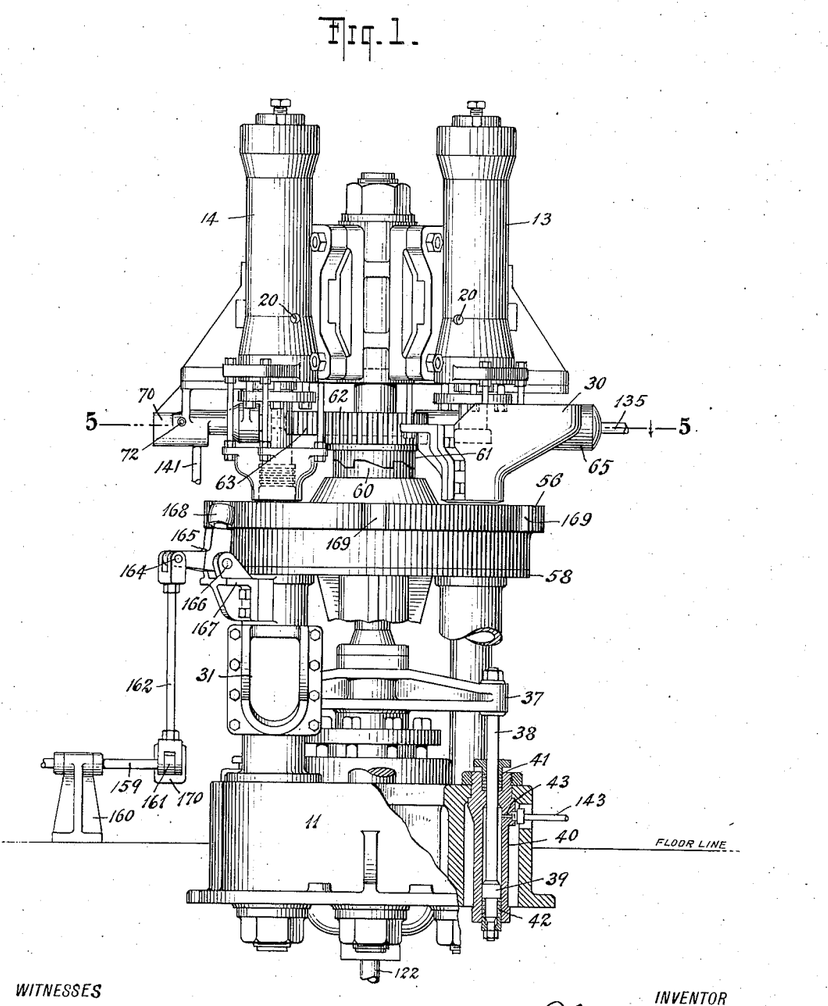
Figure 1 is an elevation of the press, partly in section.

The main ram 34 carries also a cross-head 37 from the opposite ends of which rods 38 depend, said rods being formed or provided at their lower ends with pistons 39 slidably fitting the pull-back cylinders 40 set into the lower platen 11 at the proper points as shown on Fig. 1. The rods 38 pass through suitable stuffing boxes 41, while the pistons carry suitable packings 42, the cylinders 40 with their connected and coöperating parts being located in positions of ready accessibility. The pull-back cylinders 40 are each provided with a port 43 the purpose of which will appear more fully further on in the description. The main cylinder 32 and its ram 34 and plunger 35 is located at or near the center of the imaginary triangle formed by the upright posts 12, $12^a$ and $12^b$ and in axial alinement with but spaced from a stationary head 44 secured to and depending from the upper platen 10 as shown in Fig. 2.

A member 45 having an aperture 46 for the accommodation of the stationary head 44 is provided with lugs 47 which are connected with the one end of rods 48 depending from a clevis 49 as shown in Figs. 2 and 4, said clevis being pivotally connected with a link $49^a$ which in turn is pivotally connected at 50 with a lever 51 pivoted at 52 upon a bracket 53 secured to the upper platen 10 as illustrated also in Figs. 2 and 4. A counterweight 54 is adjustably mounted upon the lever 51 and secured in position thereon by friction alone or in any suitable manner as, for instance, by a bolt $54^a$, the lever 51 in the normal position of the parts resting upon a stop 55 secured to and extending upwardly from the upper platen 10 as shown in Fig. 2; in the preferred arrangement a shock-absorbing cushion $55^a$ of wood or other suitable material is located upon the stop 55 and beneath the lever 51.

The machine or press further comprises a horizontal mold table 56 rotatably mounted upon the vertical post 12 and provided with six molds 57 of the floating type fitted into suitable apertures in said table as shown in Fig. 5; the molds are arranged on the table so as to periodically register with the various rams in the operation of the machine. A stationary plate 58 serves to close the lower ends of the molds at all points excepting at the main ram 34 which works upwardly and at the ejecting plunger 23; at these points the plate 58 is provided with an opening 59 for the accommodation of the main ram 34 and with a similar opening through which the finished briquets are ejected into the discharge chute 31.

The mold table 56, in the illustrated example, rigidly carries one member 60 of a clutch which meshes with a coöperating clutch member 61, the latter being rigidly connected with a gear 62; in addition to their rotative movements about the vertical post 12 as an axis, the connected clutch member 61 and gear 62 are capable of a sliding movement thereon as will be hereinafter more fully set forth. The gear 62 is in mesh with a horizontally arranged rack 63 forming part of or connected with a plunger 64 slidable in a cylinder 65 carried by the upper platen 10, a suitable stuffing box 66 being provided to pack the plunger 64; as shown in Fig. 5 the cylinder 65 is formed with a port 67 whereby the operating medium is conducted thereto in the manner to be fully explained hereinafter. The rack 63 carries a retrieving plunger 68 which passes through a suitable stuffing box 69 into a retrieving cylinder 70 also supported upon the upper platen 10. The retrieving cylinder plunger 68 and its cylinder 70 are of relatively less cross-sectional area than the plunger 64 and its cylinder 65 and comprise the means whereby the rack 63 is caused to describe a movement of recovery after having been fed forward by the plunger 64 in the periodical actuation of the mold table 56. The cylinder 70 includes also an inlet port 71 and further as shown in Figs. 1 and 5 is provided with an air vent 72 of any suitable type and construction.

A stop arm 73 is pivotally mounted on the vertical post $12^a$ and is connected with the rack 63 by means of a link 74, said arm 73 being movable by said rack into and out of the path of stops 75 located at spaced intervals upon the mold table 56; the stops 75 correspond in number to the number of molds 57 and, by coöperation with the arm 73, serve to stop the table 56 at the proper points to bring the molds into registry with the several rams at the proper times.

The hydraulic machinery whereby the press is actuated, in the illustrated example, comprises an accumulator 76 and an intensifier 77; as shown diagramatically in Fig. 8 the accumulator 76 is connected by means of a pipe 78 with a port 79 located in a block $79^a$ and connected with a channel $79^b$ in said block, the channel $79^b$ in turn being connected by means of a pipe 80 with a suitably operated pump 81. The communication between the port 79 and channel $79^b$ is controlled by means of a suitable valve $79^c$ which is maintained upon and returned to its seat by means of a coil spring $79^d$ as shown diagrammatically in Fig. 8. A passage 82 in the block $79^a$ extends from the channel $79^b$ and is connected by means of a pipe $82^a$ with a supply tank 83 from which a pipe 84 leads also to the pump 81. Communication between the channel $79^b$ and passage 82 is controlled through the medium of a by-pass valve 85 which is maintained in its closed position by means of a counterweight located directly above the accumulator and is operatively connected with a lever $85^a$ pivoted at $85^b$, suitable stops $85^c$ being provided for restricting the pivotal movements of said lever $85^a$; a weight $85^d$ is suspended from one end of the lever $85^a$ and serves to raise the valve 85 from its seat as soon as the counterweight above the accumulator is lifted by the action of the latter. The accumulator 76 may be of any suitable construction and as shown comprises a ram 76ᵃ and a suitable ballast tank 76ᵇ connected by means of a flexible connection 86 with the lever 85ᵃ of the by-pass valve 85. With this arrangement the pump 81 discharges freely through the branch pipe 82ᵃ into the supply tank 83 when the accumulator is up owing to the fact that, in this position of said accumulator, the by-pass valve 85 is lifted from its seat; at the same time the valve 79ᶜ closes the connection between the channel 79ᵇ and the port 79 and thus shuts off communication between the pump 81 and the accumulator 76. When the latter is down the by-pass valve 85 is closed and the pump consequently forces the water through the channel 79ᵇ and port 79 into the accumulator, the valve 79ᶜ being opened by the pressure of the water. The accumulator 76 is further connected, by means of a pipe 87 with a collecting chamber 88 formed in a block 88ᵃ, said chamber 88 being also connected, by means of a pipe 89, with the port 17 of the packing cylinder 13 and by means of a passage 88ᵇ with a channel 88ᶜ extending through the block 88ᵃ as shown in Fig. 8. Communication between the passage 88ᵇ and channel 88ᶜ is controlled by means of a check-valve 88ᵈ which is maintained on and returned to its seat through the medium of a spring 88ᵉ located in a chamber 88ᶠ, the latter being also in communication with the channel 88ᶜ; a port 88ᵍ in the block 88ᵃ communicates with the chamber 88ᶠ and thus with the channel 88ᶜ as shown in Fig. 8. One end of the channel 88ᶜ is connected, by means of a pipe 90 with the high pressure side of the intensifier 77, which also may be of any suitable construction; a similar pipe 91 leads from the ports 88ᵍ to the port 19 of the ejector cylinder 14.

A shock absorber 87ᵃ of any well known construction may be located anywhere in the line connecting the pump 81, accumulator 76 and collecting chamber 88 in the usual way for relieving undue pressures which may develop in the operation of any hydraulic equipment of the present description.

Figures 6, 7:
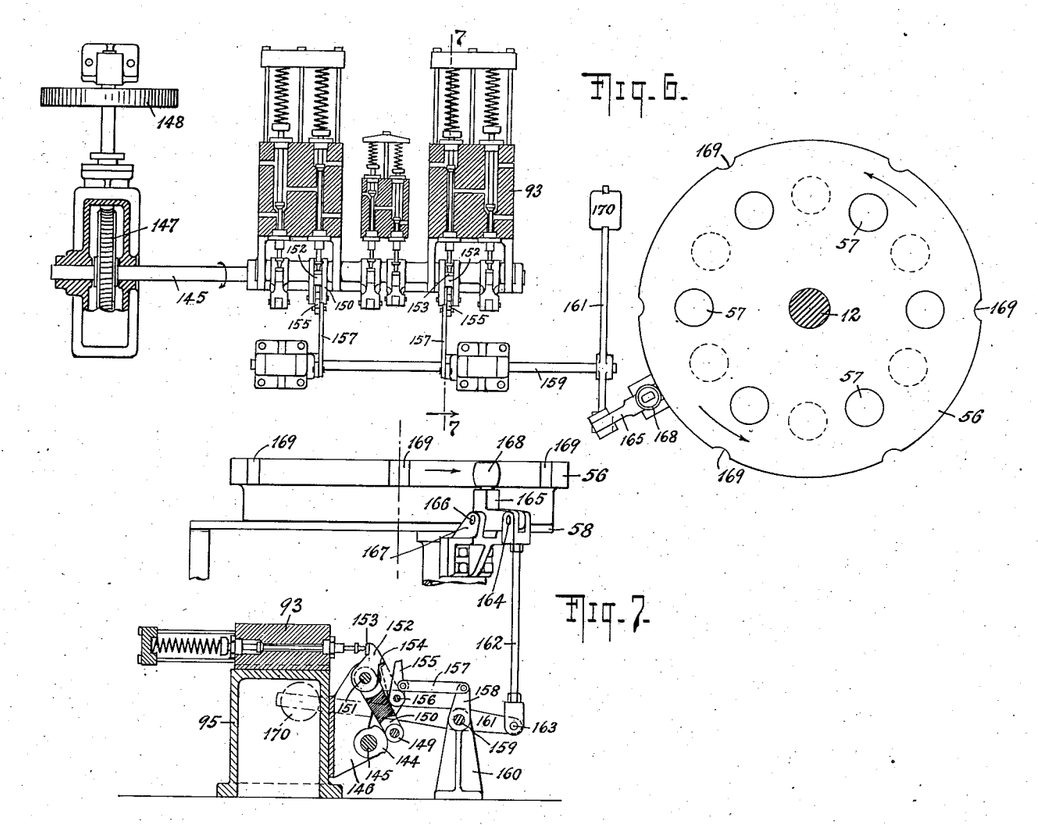
Fig. 6 is a diagrammatic view, partly in section, illustrating a safety mechanism forming part of my invention.
Fig. 7 is a section on the line 7—7 of Fig. 6.

The mechanism in the form illustrated in Figs. 6, 7 and 8 further includes three valve casings 92, 93 and 94 mounted upon a suitable base 95 as shown in Fig. 7. The valve casing 92 contains two parallel passages 96 and 97 each having a suitable valve seat and connected by means of a transverse passage 98. A port 99 communicates with the channel 96 and is connected by means of a pipe 100 with the collecting chamber 88, the communication between the port 99 and transverse channel 98 through the channel 96 being controlled by an inlet-valve 101; the latter is carried by a stem 102 which extends exteriorly of the casing 92 as shown in Figs. 6 and 8. A second port 103 extends from the channel 96 and is connected by means of a pipe 104 with the port 16 of the packing cylinder 13, said ports 99 and 103 being located upon opposite sides of the inlet valve 101 as shown in Figs. 6 and 8. A port 105 in the valve casing 92 communicates with the channel 97 and is connected by means of a pipe 106 with the low pressure side of the intensifier 77; a discharge port 107 in said valve casing 92 extends from the channel 97 and is connected by means of a branch pipe 108 with the return pipe 109 which leads to the supply tank 83. A discharge valve 110 controls the connection between the port 107 and channel 97 and is carried by a stem 111 which also projects exteriorly of the casing 92 as shown in Figs. 6 and 8. The valves 101 and 110 are maintained on their respective seats and returned thereto by means of suitable springs 112.

The valve casing 93 is constructed with two parallel passages 113 and 114 each having a suitable valve seat therein and connected by means of a transverse passage 115; an inlet port 116 extends from the passage 113 and is connected by means of a pipe 117 with the other end of the channel 88ᶜ of the check valve block 88ᵃ. The communication between the port 116 and the channel 113 is controlled by an inlet valve 118 secured upon a stem 119 which projects exteriorly of the casing 93 as shown in Figs. 6 and 8. A port 120 extends from the channel 113 and is connected by means of a pipe 121 with the port 18 of the ejector cylinder 14; a similar port 120ᵃ extends from the channel 114 and is connected by means of a pipe 122 with the port 33 of the main pressure cylinder 32; the casing 93 contains also a discharge port 123 which extends from the channel 114 and is connected by means of a branch pipe 124 with the return pipe 109. The communication between the channel 114 and the port 123 is controlled by means of a discharge valve 125 located upon a stem 126 which also projects exteriorly beyond the casing 93 as shown in Figs. 6 and 8. The valves 118 and 125 are maintained on their seats and returned thereto by suitable springs 126ᵃ.

In the valve casing 94, two parallel channels 127 and 128 each containing a suitable valve seat, are connected by means of a transverse channel 129 as shown in Figs. 6 and 8. An inlet port 130 extends from the channel 127 and is connected by means of a branch pipe 131 with the chamber 88 of the check-valve block 88ᵃ; the communication between the port 130 and the channel 127 is controlled by means of an inlet valve 132 carried by a stem 133 which projects exteriorly beyond the casing 94. A second port 134 extends from the channel 128 and is connected by means of a pipe 135 with the port 67 of the cylinder 65. The casing 94 further includes a discharge port 136 which extends from the channel 128 and is connected by means of a branch pipe 137 with the return pipe 109; communication between the channel 128 and the discharge port 136 is controlled through the medium of a discharge valve 138 mounted upon a stem 139 which projects exteriorly beyond the casing 94 as shown in Figs. 6 and 8. The valves 132 and 138 are maintained upon and returned to their seats by suitable springs 140.

In addition to the connections so far described the arrangement includes a branch pipe 141 which leads from the pipe 89 to the port 71 of the retrieving cylinder 70; similar branch pipes 142 and 143 connect the pipe 89 with the ports 43 of the respective pull-back cylinders 40 as shown in Fig. 8.

The construction is such that the various valve stems are located in a row along an imaginary line as shown in Figs. 6 and 7. The means whereby the several valves are positively operated against the tension of the respective springs may, as shown, comprise a series of cams 144 carried by a cam shaft 145 journaled in suitable bearings 146 mounted upon the base 95. The shaft 145 may be rotatably actuated in any convenient manner, as by means of worm gearing 147 operated, for instance, through the medium of a belt driven pulley 148 as shown in Fig. 6. The cams 144 are in operative engagement with rollers 149 carried by arms 150 which in turn are secured upon a pivot shaft 151 journaled in the bearings 146; four dogs 152 having heads 153 in contact with the valve stems 111, 133, 139 and 126 form extensions at the arms 150 and partake of the movements thereof at all times while the machine is in operation; two of the dogs 152 which coöperate with the valve stems 102 and 119, however, are loosely mounted upon the pivot-shaft 151 and constitute elements of a safety device whereby the pressure admission valves 101 and 118 remain unoperated in case the mold table stops before the molds are in proper position in registry with the respective rams. As shown in Fig. 7 the two dogs 152 in question are formed with shoulders 154 with which the free ends of pawls 155 are in engagement under normal conditions. These pawls 155 are pivoted at 156 upon the proper arms 150 and are connected by means of links 157 with members 158 secured upon a counter-shaft 159 rotatably mounted in bearings 160; in addition to the above a lever 161 is fastened upon the shaft 159 so as to project in opposite directions therefrom as shown in Fig. 7. A rod 162 is pivotably connected at 163 with one end of said lever 161 and further is pivotally connected at 164 with one member of a bell-crank 165 which is pivoted at 166 upon a bracket 167 fastened upon a suitable stationary portion of the press; the other member of the bell-crank 165 carries a roller 168 adapted to ride along the periphery of the mold table 56 and to drop into notches or recesses 169 formed therein at intervals. The notches 169 correspond in number to the number of molds 57 and are located with respect thereto and with respect to the roller 168 so as to bring a notch into complete registry with said roller each time the mold table is actuated properly and to the full extent; if the intermittent actuation of the table is insufficient or otherwise faulty the roller will remain on or be again brought into engagement with the periphery of said table for the purpose to be more fully described hereafter. The roller 168 is maintained in engagement with the periphery of the mold table 56 and forced into a notch 169 at the proper time through the medium of a weight 170 slidably mounted upon the lever 161 and secured in an adjusted position thereon in any suitable manner.

It will be understood that the customary needle valves, or throttle disks are provided in the pressure lines 135, 104, 121 and 122 leading respectively to the table, packing, ejecting and main press cylinders for limiting the speed of movement of the respective plungers in the well known way. Similarly air vents are provided on the pressure side of the packing, ejecting, main, table, and retrieving cylinders and also on the retrieving side of the packing and ejecting cylinders; in the same way similar vents are provided in the accumulator and intensifier and at all other points where air pockets may be formed.

During the operation of the machine the cam-shaft 145 and cams 144 are continuously rotated at the required speed, which is relatively slow, through the medium of the worm-gearing 147 and belt-driven pulley 148. In utilizing the press the material which may be in the form of chips, is introduced into the filling hopper 30 from which the particular mold 57 which happens to be in position beneath the same, is filled. At this stage the valve 101 is opened by the coöperating cam 144 so that the hydraulic pressure medium passes from the accumulator 76 through the pipe 78—87 into the collecting chamber 88 of the check-valve block 88ᵃ from which it passes into the pipe 100 the check-valve 88ᵈ being closed; from the pipe 100, said pressure medium passes through the port 99 and past the open valve 101 into the channel 96. From the channel 96 the hydraulic pressure medium passes out through the port 103 and through the pipe 104 and inlet 16 into the packing cylinder 13 and thus brings about a downward actuation of the packing ram 22 whereby the contents of the particular mold 57 are firmly packed therein. As soon as the packing has been completed, the particular cam 144 permits the valve 101 to return to its seat under the action of its spring 112 so that the accumulator pressure is cut off from the ram 22. Coincidentally with this operation another cam 144 has moved the discharge valve 110 to an open position thus relieving the ram 22 so that the accumulator pressure which is constantly effective upon the under side of the piston head 26 of the ram 22, through the pipes 78—37, chamber 88, pipe 89, and port 17 raises the ram 22 and returns it to its normal position. As this occurs the hydraulic medium which is in the cylinder 13 above the piston-head 26 and in the connecting pipes, etc., is forced back through the port 16, pipe 104 and port 103 into the channel 96 from which it is now forced to pass into the transverse channel 98 because the valve 101 is closed. From the transverse channel 98 the hydraulic medium passes to the channel 97 and past the open discharge valve 110 to the port 107 from which it flows through the branch pipe 108 and pipe 109 back to the supply tank 83. Because of the greater area of the upper surface of the piston head 26 upon which the pressures hereinbefore referred to are effective, the upward resistance of the accumulator pressure upon the underside of said piston head 26 is readily overcome and the operative downward movement of the ram 22 thus easily brought about.

As soon as the packing ram 22 has been raised the inlet valve 132 is opened by the action of its coöperating cam 144 so that accumulator pressure passes from the pipe 78—87 and chamber 88 through the pipe 131 into the port 130 and past the open valve 132 into the channels 127, 129 and 128. From the channel 128 the pressure medium flows through the port 134, pipe 135 and port 67 into the cylinder 65 and thus actuates the plunger 64 whereby the rack 63 is caused to operate the gear 62 and thus rotate the mold table 56 a distance corresponding to sixty degrees. When this has been accomplished the valve 132 is closed under the action of its spring 140 and at the same time the discharge valve 138 is opened through the medium of its coöperating cam 144. As soon as this happens the accumulator pressure which is constantly effective upon the relatively smaller retrieving plunger 68, through the pipes 78—87, chamber 88, pipes 89 and 141 and port 71, causes the rack 63 to move in the opposite direction whereby the gear 62 is rotated in a reverse direction. The plunger 64, which partakes of this reverse movement of the rack 63 now forces the hydraulic medium which is in the cylinder 65 back through the port 67, pipe 135, port 134 and into the channel 128. From the latter said medium flows past the open valve 138 and out through the port 136 and pipe 137 to the pipe 109 through which it flows back to the supply tank 83. During the movement of recovery above described the clutch member 61 rides up on the clutch member 60, thus causing both the gear 62 and clutch member 61 to move lengthwise of the vertical post 12 and to finally drop back with the clutch members 60 and 61 again in engagement with each other; it will be understood that the gear 62 is of sufficient axial width to maintain it in engagement with the rack 63 as the gear 62 and clutch member 61 rise up on the post 12 during the movement of recovery. It will further be understood, because of the fact that the plunger 64 is of greater area than the plunger 68, that the constant accumulator pressure upon the latter is easily overcome by the accumulator pressure upon the former when it is applied to bring about an intermittent rotation of the table 56.

The sixty degree movement of said table 56 brings the first mold with the packed material therein to an idle position between the packing ram and the main ram 34 and at the same time brings a second mold 57 into position beneath the filling hopper 30. The material is fed into and packed in this second mold in the same manner as hereinbefore described, after which the table 56 is rotated another sixty degrees. This brings a third mold into registry with the filling hopper which is filled and packed in the same way and at the same time brings the second mold to an idle position and the first mold to a position directly over the main ram 34 and beneath the stationary counter plunger 44.

At the proper moment one of the cams 144 opens the inlet valve 118 and thus permits the hydraulic medium under the pressure of the accumulator, to pass from the chamber 88 through the passage 88$^b$ whereby the check-valve 88$^d$ is opened, to the channel 88$^c$ and through the pipe 117 and the port 116 past the open valve 118 into the channel 113; from this channel said medium passes through the transverse channel 115 into the channel 114. The discharge valve 125 being closed at this stage, the hydraulic medium is forced to pass through the port 120 into the pipe 122 and through the port 33 into the cylinder 32 where it acts upon the ram 34. The latter is thus forced upward and carries with it the plunger 35 and the pistons 39 which are thus moved upwardly in the pull-back cylinders 40; as the plunger 35 is raised it enters mold number one from below, through the opening 59 of the plate 58, and exerts its pressure upon the chips or other material in said mold. The friction of the chips upon the inner surface of the mold 57, causes it to lift, it being of the floating type and thus compresses the chips or material between the plunger 35 and the stationary plunger 44, the diameter of which permits it to enter said mold 57. This movement of the mold has the effect of two moving plungers, thus not only materially reducing the wear on the mold, but also increasing the final hardness of the upper side of the briquet. A downward pressure is exerted against the mold by the member 46 under the action of the counterweight 54 on the lever 51, which serves to assist the mold to retrieve into position on the mold table 56 at the proper time.

The opening of the inlet valve 118 whereby accumulator pressure is admitted to the cylinder 32 is followed by an opening of the inlet valve 101 whereby the hydraulic medium passes from the chamber 88, into the pipe 100, through port 99 and open valve 101 into channel 96; from this channel said medium passes through the transverse channel 98 into channel 97. The discharge valve 110 being closed at this stage, the hydraulic medium is forced to pass through port 105 into the pipe 106 into the low pressure cylinder of the intensifier 77. The pressure of the hydraulic medium in the low pressure cylinder of the intensifier 77 causes an upward movement of the floating cylinder 77ª into the upper end of which extends the hollow stationary ram 77ᵇ which is in connection with the pipe 90. The pressure of the hydraulic medium is intensified in direct proportion to the ratio of the areas of the floating cylinder 77ª to the diameter of the hollow ram 77ᵇ.

The intensified hydraulic medium passes from the hollow ram 77ᵇ through a suitable port into the pipe 90, thence through the channel 88ᵉ into the chamber 88ᶠ. The intensified pressure of the hydraulic medium at this stage overcomes the accumulator pressure in the collecting-chamber 88 and thus closes the check-valve 88ᵈ, whereby said intensified hydraulic medium is caused to pass out of the channel 88ᵉ into the pipe 117. From this pipe 117 said medium continues through the port 116, past the open valve 118 and through the channels 113, 115, and 114, port 120ª, pipe 122 and port 33 into the cylinder 32 where it exerts its effect upon the ram 34 and consequently upon the plunger 35.

The pressure completing the briquet is thus applied in two stages, the valve gear first admitting accumulator pressure whereby the volume of chips contained in the mold is considerably reduced and then admitting intensified pressure which completes the formation of the briquets. From this it is apparent that the volume of the material is reduced, so far as possible with the relatively low pressure and the briquets completed with a minimum of high pressure water. The slow building up of pressure by stages allows the contained air in the material to be fully ejected, and thus prevents the formation of air pockets and a tendency of the briquet to expand and weaken. The intermittent opening and closing of the controlling valves, through the action of the valve mechanism, and also the pulsating action of the pump 81 causes an irregular pressure on and movement of the pressing plunger, whereby the expulsion of the air contained in the material is facilitated. The pressure is brought up to a maximum and is held long enough to overcome the inherent elasticity of the material and allow it to take a permanent set.

At the completion of the operation whereby the briquet is formed the valve 101 is closed and the discharge valve 110 is opened through the action of the operating cams 144. This permits the hydraulic medium in the lower cylinder of the intensifier 77 to pass through the pipe 106, port 105, into the channel 97 and through the open valve 110 into the port 107 and thence into the branch discharge pipe 108 and main discharge pipe 109 back to the supply tank 83. This movement is accelerated by the accumulator pressure which is constantly effective in the collecting-chamber 88, said pressure lifting the valve 88ᵈ and passing into the chamber 88ᶠ and from thence through the channel 88ᵉ, pipe 90 and hollow stationary ram 77ᵇ back into the floating cylinder 77ª.

Immediately following the closing of the valve 101 and the opening of the discharge valve 110 and possibly before the intensifier has been entirely retrieved, the inlet valve 118 is closed and the discharge valve 125 is opened. The pressure on the ram 34 is thus removed and permits the accumulator pressure which is constantly effective on the pull-back pistons 39 through the pipes 78—87, check-valve 88, pipes 89, 142, 143 and ports 43, to force said pistons 39 downwardly in the cylinders 40 whereby the ram 34 and plunger 35 are returned to normal position. As this occurs the hydraulic medium beneath the ram 34 is forced back through the pipe 122, port 120ª, channel 114, past the open valve 125 and through the port 123 and pipe 124 to the return pipe 109 whereby it is conducted back to the supply tank 83.

The return movement of the plunger 35 and ram 34 is accompanied by a downward movement of the mold 57 relatively to the mold table under the action of the weight 54 exerted upon the member 45, whereby said mold 57 and with it the finished briquet contained therein, are returned to their initial positions in the mold table 56.

The accumulator pressures heretofore referred to upon leaving the channel 96 divides itself into two streams, one of which passes to the low pressure cylinder of the intensifier as previously mentioned and the other of which passes from the channel 96 through the port 103, pipe 104 and port 16 into the packing cylinder 13 as hereinbefore pointed out. The stream of hydraulic medium under intensified pressure also divides itself into two streams when it reaches the channel 113, one of which passes through the pipe 122 into the main cylinder 32, as previously mentioned, and the other of which passes through port 120 into said pipe 121, and finally reaches the ejecting cylinder 14 through the port 18 subsequent to the accumulator pressure as will appear more fully hereinafter.

Following the completion of the briquet and the return of the main ram 34 and its connected parts to normal position, the mold table 56 is rotatably advanced another sixty degrees which brings the first mold to an idle position between the main plunger 35 and ejecting ram 23 and at the same time brings the second mold into a position in registry with said main ram whereby the briquet is finished in said second mold in the same way as previously explained. This actuation of the table also brings the third mold to an idle position and a fourth mold into position beneath the filling hopper 30 and packing plunger 22.

At the proper time the mold table 56 is rotatably advanced still another sixty degrees, through the medium of the rack 63, gear 62 and clutch 61—60, which brings the first mold to a position directly under the ejecting ram 23. The latter is operated at the proper time first by the same accumulator pressure whereby the main ram 34 is initially operated and which passes from the pipe 117, through the port 116, past the open valve 118 and through the channels 113, port 120, pipe 121, port 18 to the cylinder 14; the accumulator pressure is followed by the same intensified pressure whereby the main ram 34 is actuated and which reaches the cylinder 14 in the manner previously described.

As the ram 23 descends under the above pressures its head 24 finally engages the finished briquet, first with a relatively low pressure and then with an intensified pressure, and forces it from the first mold into the ejector chute 31 whereby it is discharged from the press. Ordinarily, the briquet is ejected by means of the accumulator pressure on the ejecting ram 23 unless the mold is unduly worn or excessive thickness of the briquet and the resultant additional friction of the material being briqueted prevents such ejection, whereupon the intensified pressure which follows completes the operation. With this arrangement a minimum of power is consumed.

At the completion of the ejecting operation the pressure upon the piston head 26 is removed through the action of the valve gear closing inlet valve 118 and opening discharge valve 125 and the ram 23 is returned to normal position by pressure from the accumulator 76 which passes through the pipes 78—87, chamber 88, pipe 91, port 19 to the cylinder 14 beneath the piston head 26. The hydraulic medium above said head 26 is thereby forced back through the port 18, pipe 121, port 120, channels 113, 115, 114, past the open valve 125, through the port 123 and branch pipe 124 to the return pipe 109 whereby it is returned to the supply tank 83. During the interval in which the intensified pressure has been exerted upon the ejecting ram 23, this pressure is also active on the retrieve side thereof, through the pipe 91 and port 19, thus equalizing the tendency of the high pressure to force its way past the packing 27 along the walls of the cylinder 14.

The packing, pressing and ejecting operations are all performed concurrently, three alternate molds being always in operative position beneath the respective rams, while the other three molds temporarily occupy idle positions; when the pressures are removed the plungers retrieve automatically, their return side being constantly under accumulator or intensifier pressure. After being so retrieved the mold table, as hereinbefore described, is revolved through an arc of sixty degrees, the table 56 being brought to rest in the proper positions, by means of stops 75 on said table coöperating with the arm 73 operatively connected to the rack 63 by the link 74. The arm 73 is moved into and out of the path of the stops 75 at the proper time, in synchronism with the operation of the rack 63 which controls the intermittent rotation of said mold table. With all of the parts properly coöperating to bring the table 56 to rest at the intended points, the roller 168 is located in a notch 169, in each stationary position of said table 56 and thus, through the medium of the bell-crank 165, rod 162, lever 161, shaft 159, members 158 and links 157, positions the pawls 155 beneath and in contact with the shoulders 154 of those two dogs 152 which control the operations of the inlet valves 101 and 118. With the pawls 155 in this position, indicated by dotted lines in Fig. 7, the two valves 101 and 118 will be opened at the proper times through the action of their coöperating cams 144 and the functions of the various parts of machine will be carried out in the intended manner. During the periodical rotation of the mold table 56 the roller 168 will ride along the periphery of the table between notches 169 and will accordingly exert a pull upon the links 157 through the medium of its connected parts, whereby the pawls 155 are moved from beneath and out of contact with the shoulders 154 to the position shown by full lines in Fig. 7. With the pawls 155 in this position, the actuation of two of the arms 150 by their coöperating cams 144 will have no effect on the coöperating dogs 152 with the result that the inlet valves 101 and 118 remain closed and no hydraulic actuating medium is admitted to the various cylinders, excepting the table cylinder, during the time the mold table 56 is being rotatably advanced to different, successive positions. If said periodical shifting of said table 56 is sufficient to cause the roller 168 to drop into a subsequent notch 169, the pawls 155 will be returned to their operative positions beneath the shoulders 154 and the operation of the inlet valves 101 and 118 and of the press will proceed without interruption. If, on the other hand, the movement of the table 56 is insufficient to bring a subsequent notch 169 into registry with the roller 168, which means also that the molds are not in proper registry with the several rams, then the roller 168 will remain upon the periphery of the table 56 and the pawls 155 will continue to occupy the position indicated by full lines in Fig. 7. With the parts in this position the actuation of the arms 150 by the cams 144 will have no effect and the two dogs 152 which control the valves 101 and 118 will remain idle so that these valves will not be opened but will remain in their closed positions. As a result of this the hydraulic actuating medium will not be admitted to the several rams when the table is in this inoperative position; the trouble may be corrected by manually shifting the table to the necessary extent in either a forward or rearward direction to remove any obstruction and the rack 63 and its correlated parts may then be permitted to shift the table to its next operating position if this movement was not completed. The incorrect shifting of the table may be due to temporary disarrangement of the parts, to incorrect adjustment thereof, or to other temporary causes though ordinarily caused by extraneous pieces of material wedging between the table and other parts. Before moving the table manually to overcome obstructions, it is necessary to stop the operation of the valve gear and to bring it to a position with discharge valves 110, 125 and 138 open, to prevent the inadvertent movement of any press part and possible danger therefrom. The roller 168 and its coöperating parts, together with the notches 169, thus constitute a safety device whereby injury to the apparatus is prevented.

Instead of having the various valves arranged and located in individual casings as hereinbefore described, all of said valves, with the various passages controlled thereby, may be located in a single casing or block, for instance, as illustrated in Figs. 9, 10, 11 and 12. This arrangement is very compact and efficient and does away with the necessity for a plurality of valve casings in cases where this is not desired. As illustrated in said Figs. 9, 10, 11 and 12 some of the passages of Figs. 6, 7 and 8 have been combined in a single passage, without in any way changing the operation, an instance of this being shown in Figs. 10 and 12 in which the passages 107, 108, 136, 137, 123 and 124 are replaced by a single passage. The construction is thus reduced to a simple form, it being understood that the operation and sequence of operation is exactly the same as hereinbefore set forth.

It will be noted that the major supporting means in my improved machine comprises three vertical posts arranged at the apices of an imaginary triangle and that the mold table is rotatably mounted upon one of said posts. With this arrangement the main ram is located at or near the center of the imaginary triangle formed by the three posts and thus provides an extremely rigid construction whereby the greatest strains, incident to the operation of the machine, are efficiently taken up and neutralized. The mold table by including six floating molds, reduces the stroke of the table actuating plunger to a minimum. Furthermore, by pivoting the table stop on one of said posts the thrust is directly taken by one of these posts and a positive and solid construction is provided.

My improved machine, in addition, includes an efficient mechanism comprising a simple notched or toothed clutch, the lower half of which is secured to the table and the upper half of which is carried by the gear which engages the table shifting rack; the upper half of the clutch with the gear is free to lift when retrieving. All rams are outside packed thus making inspection thereof and repairs or adjustments easily possible; the main ram is equipped with cross-head and separate pull-back cylinders for ready accessibility. In my improved machine the rate of the stroke of the packing and ejecting rams is limited through the medium of the needle valves or throttle disks hereinbefore referred to thus eliminating serious hammer blows.

The three two-spindle operating valves whereby the operation of my machine is controlled are efficient in operation and readily accessible whereby leaks and other troubles may be quickly located and cured. These operating valves are opened and closed at proper time intervals by means of valve lift levers which are actuated through the medium of a cam shaft and cams; this cam shaft is preferably driven by means of a worm reduction and belted connection. The press design makes right and left hand machines easily possible, with relatively minor alterations.

In addition the improved safety device controlled by the table itself prevents injury to the parts and insures the correct operation of the machine at all times.

Various changes in the specific form shown and described may be made within the scope of the claims without departing from the spirit of my invention.

I claim:

1. In a briqueting machine, a mold adapted to contain briqueting material, pressure means for compressing said material to form a briquet, an accumulator, an intensifier and controlling means whereby accumulator pressure and intensifier pressure are successively admitted to said pressing means.

2. In a briqueting machine, a rotatable mold table, a plurality of molds carried by said table and adapted to contain briqueting material, a packing plunger whereby said material is preliminarily packed, a main ram whereby said material is pressed to form briquets, an ejector ram whereby the finished briquet is ejected from the mold, and means whereby pressures of varying degrees of intensity are successively and concurrently applied to said plunger and said rams.

3. In a briqueting machine, a rotatable mold table having a plurality of molds, a packing ram, a pressing ram, an ejector ram, a plurality of cylinders, pistons therein operatively connected with said rams, an accumulator, an intensifier, connections from said accumulator and intensifier to said cylinders whereby a hydraulic medium is conducted thereto to concurrently actuate said pistons and connected rams, inlet and discharge valves whereby said hydraulic medium is controlled and means for actuating said valves to permit said medium to act upon said pistons successively at accumulator pressure and at intensified pressure.

4. In a briqueting machine, a rotatable mold table having a plurality of molds, a packing ram, a pressing ram, an ejector ram, a plurality of cylinders, pistons therein operatively connected with said rams, an accumulator, an intensifier, connections from said accumulator and intensifier to said cylinders whereby a hydraulic medium is conducted thereto to concurrently actuate said pistons and connected rams, inlet and discharge valves whereby said hydraulic medium is controlled, means for actuating said valves to permit said medium to act upon said pistons successively at accumulator pressure and at intensified pressure.

5. In a briqueting machine, a rotatable mold table provided at intervals with peripheral recesses, molds carried by said table and adapted to contain briqueting material, a packing ram, a pressing ram, an ejector ram, a plurality of cylinders, pistons therein operatively connected with said rams, an accumulator, an intensifier, connections from said accumulator and intensifier to said cylinders whereby a hydraulic medium is conducted to said cylinders to concurrently actuate said pistons and connected rams, inlet and outlet valves whereby said hydraulic medium is controlled, a shaft, dogs carried by said shaft and arranged to actuate said valves, the dogs coöperating with the inlet valves being loose on said shaft, arms whereby said dogs are operated, pawls whereby the loose dogs and their coöperating arms are operatively connected, mechanism including a roller arranged to travel on the periphery of said mold table and to drop into the recesses thereof, said mechanism actuating said pawls to break the connection between said arms and said dogs when the roller is upon the periphery of said table and restored when said roller drops into one of said recesses and cam mechanism for actuating said arms to permit said medium to act upon said pistons first at accumulator pressure and then at intensified pressure.

In testimony whereof I have hereunto set my hand.

THOMAS GILMORE, Jr.